(12) United States Patent
Davis et al.

(10) Patent No.: US 6,619,060 B1
(45) Date of Patent: Sep. 16, 2003

(54) TRANSIENT-RESISTANT NON-PULSED ELECTRONIC AUTOMOTIVE HVAC FAN CONTROL

(75) Inventors: J. Roger Davis, Russiaville, IN (US); Michael G. McDermott, Kokomo, IN (US); R. Thomas Fisher, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/143,719

(22) Filed: May 10, 2002

(51) Int. Cl.[7] ............................................... F25D 17/00
(52) U.S. Cl. ...................................... 62/180; 236/49.3
(58) Field of Search .......................... 62/180, 178, 408; 236/49.3; 165/41; 454/75

(56) References Cited

U.S. PATENT DOCUMENTS

| | | | | |
|---|---|---|---|---|
| 4,473,109 A | * | 9/1984 | Kojima et al. .................. 165/12 |
| 4,856,710 A | * | 8/1989 | Takada et al. ................... 236/13 |
| 5,086,628 A | * | 2/1992 | Hashimoto ....................... 62/244 |
| 6,304,803 B1 | * | 10/2001 | Dao ............................... 701/36 |
| 6,460,356 B1 | * | 10/2002 | Tao et al. ....................... 62/175 |

* cited by examiner

*Primary Examiner*—Marc Norman
(74) *Attorney, Agent, or Firm*—Stefan V. Chmielewski

(57) ABSTRACT

The present invention provides an HVAC fan control that includes a front fan switch, controller, rear fan switch, rear fan control circuit and a fan motor. The front fan switch and the rear fan switch electrically connect to the controller. Also, the fan motor is electrically connected to the rear fan control circuit and a front fan switch. Accordingly, the controller is responsive to inputs form the rear fan switch to operate the rear fan control circuit and select a desired fan motor speed when a logical ON condition is provided by the front fan switch.

20 Claims, 3 Drawing Sheets

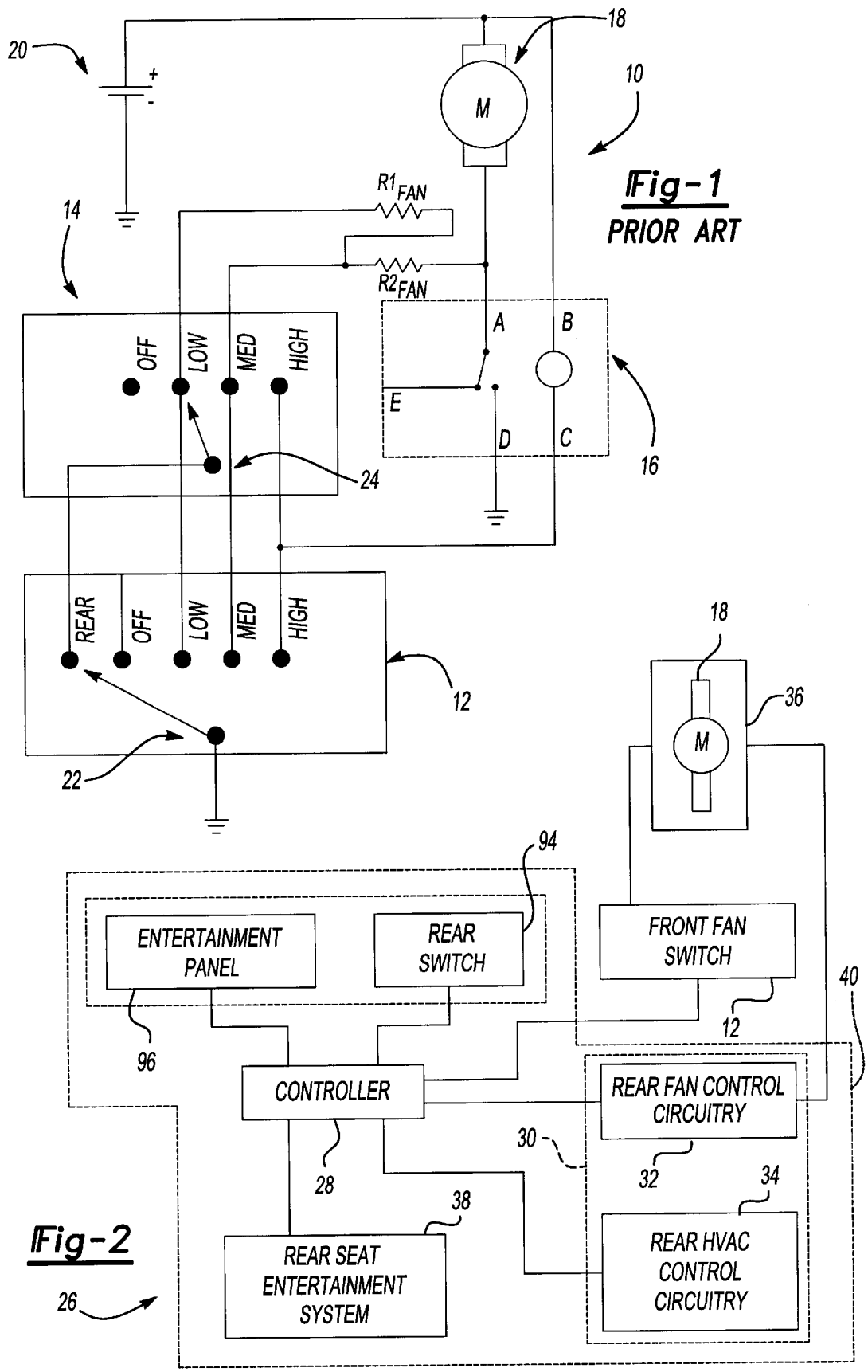

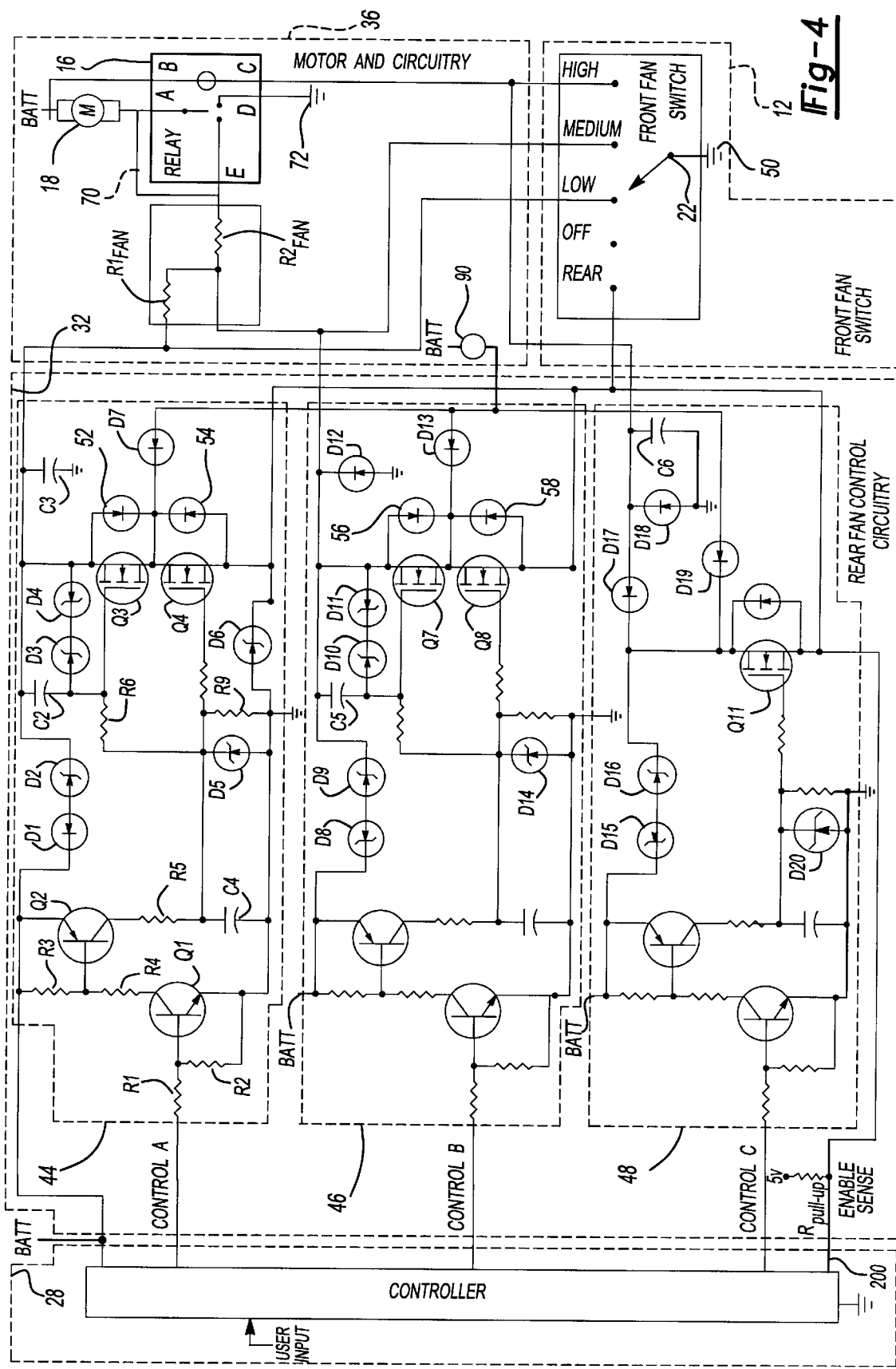

TRANSIENT-RESISTANT NON-PULSED ELECTRONIC AUTOMOTIVE HVAC FAN CONTROL

TECHNICAL FIELD

The present invention generally relates to motor control circuitry and, more particularly, the present invention relates to fan motor control circuitry used in a HVAC system that allows fan motor speed operation to be performed at two separate locations.

BACKGROUND OF THE INVENTION

With the introduction of the minivan and sport utility vehicle (SUV), rear HVAC controls have become a popular feature. These rear controls allow the vehicle's rear occupants to control the temperature and airflow in the rear of the vehicle, independent from the front HVAC settings. Additionally, an override circuit usually exists to allow the rear HVAC to be controlled from the front seat and provides the ability to disable operation of the rear control panel from the front seat.

In recent years, additional features have been added to vehicles for the benefit of rear occupants. More specifically, rear entertainment systems are now offered that allow passengers behind the front seat to control and enjoy music and videos. The addition of these rear entertainment systems as well as the controller has enlarged and/or increased the number control assemblies required in the rear of the vehicle. As a result of these additional rear seat components, the controls, often positioned overhead in the vehicle compartment, have considerably grown in size.

The related art utilizes mechanical switches in the rear passenger area to control the rear HVAC system. Switches controlling low fan speeds are capable of handling the full current load, as required by the fan motor, for all speeds selected. Alternatively, low current switches for high fan speeds activate relays or similar high current switching devices near the fan motor in a more distributed control system.

Distributed systems have used PWM (pulse width modulation) control for the control of the fan motor. Distributed systems are employed in PWM controls to avoid high EMI generated over the long wires that connect the control panel directly to the fan motor. However, such systems have a cost disadvantage by virtue of having two control assemblies, one for PWM switching the fan motor current and another for remotely controlling the PWM circuit. The present invention was developed in light of these and other drawbacks.

SUMMARY OF THE INVENTION

In light of these and other drawbacks, the present invention replaces the rear fan control mechanical switch with an electronic circuit that provides improved integration into the rear seat entertainment system.

In one aspect of the present invention, a fan control includes a front fan switch, rear fan switch, rear fan control circuit, controller and fan motor. The front fan switch and the rear fan switch are electrically connected to the controller. Likewise, the rear fan control circuit is also electrically connected to the controller. The fan motor is electronically connected to the rear fan control circuit and the front fan switch. According to this design, the controller is responsive to inputs from the rear fan switch to adjust the fan speed of the fan motor when the front fan switch provides a logical ON signal to the controller. By this means, a front seat operator is able to shift operational control to the rear seat and to disable the rear seat control.

In another aspect of the present invention, a vehicle is provided having the fan control as described above according to the present invention. Specifically, the fan control includes a front fan switch, rear fan switch, controller, rear fan control circuit and a fan motor. The front fan switch is positioned in the front seat area of the vehicle, while the rear fan switch is positioned in the rear seat area of the vehicle. Accordingly, the rear fan switch can be incorporated into an entertainment panel of an entertainment system located in the rear seat area of the vehicle.

Other objects and features of the present invention will become more readily apparent from a better understanding of the preferred embodiments described below with reference to the following drawings.

BRIEF DESCRIPTION OF THE DRAWINGS

The present invention will now be described, by way of example, with reference to the accompanying drawings, in which:

FIG. 1 is a schematic diagram of a motor control according to the prior art;

FIG. 2 is a block diagram depicting a motor control according the present invention;

FIG. 4 is a schematic wiring diagram for a motor control according to the present invention.

DESCRIPTION OF THE PREFERRED EMBODIMENTS

Figure 3A:
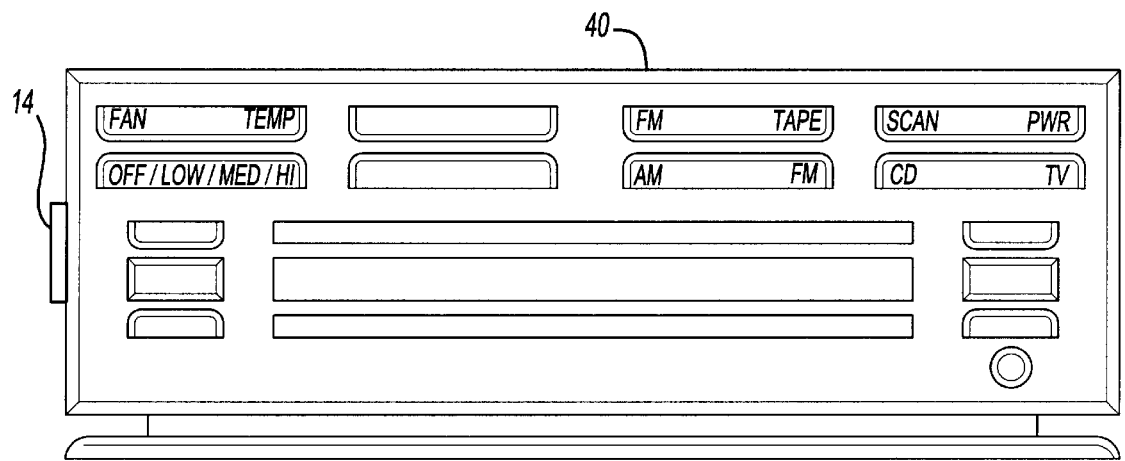
FIG. 3A is a side view of a control box for a motor control according to the present invention.

Referring now to FIG. 1, a fan motor control 10 is shown according to the prior art. The fan motor control 10 generally includes a front fan switch 12, rear fan switch 14, relay 16, stepping resistors $R1_{FAN}$ and $R2_{FAN}$, fan motor 18 and vehicle battery 20.

Front fan switch 12 generally includes selector switch 22 that selects among settings of REAR, OFF, LOW, MED, HIGH. Accordingly, by rotating selector switch 22, any one of the OFF, LOW, MED, or HIGH settings, the accompanying fan speed can be selected. Additionally, when the REAR setting is selected, fan control is switched to the rear fan switch 14. Rear fan switch 14 includes selector switch 24 that selects between positions OFF, LOW, MED, HIGH.

In operation, moving selector switch 22 to any of the LOW, MED, HIGH positions respectively applies the proper voltage across fan motor 18 to obtain the corresponding fan speed setting, as can be readily understood by one skilled in the art viewing FIG. 1. Likewise, when selector switch 22 is positioned to the REAR setting, control is switched to selector switch 24 of the rear fan switch 14. As such, rotation of selector switch 24 among the respective LOW, MED and HIGH positions applies the required voltage across fan motor 18 when REAR is selected on front fan switch 12.

As an example of operation of the circuit in FIG. 1, the LOW fan speed setting is now described. The current path for the LOW setting at the rear control begins at the vehicle battery and then passes through the fan motor 18, through $R1_{FAN}$ and $R2_{FAN}$, through the rear fan switch LOW contact, through the front fan switch REAR contact then to the chassis common ground to complete the circuit. It is important to note that the rear fan switch 14 and fan motor 18 could be active and the front fan switch can be moved from REAR to OFF, thereby breaking the current path to the chassis common ground. This will cause a large induced voltage due to the inductance of the fan motor. As the rear fan switch contact opens, resistance increases sharply, causing an abrupt change in current, thereby creating a large voltage transient due to the high rate of change of current (Voltage=Inductance times change in current per second). Reference systems have been shown to generate voltage transients in excess of 80V ($E=Ldi/_{dt}$). Mechanical switches generally dissipate this large voltage by arching between switch contacts as the contacts separate. The mechanical switches are, therefore, designed to withstand arcing action over thousands of cycles.

Figure 3B:
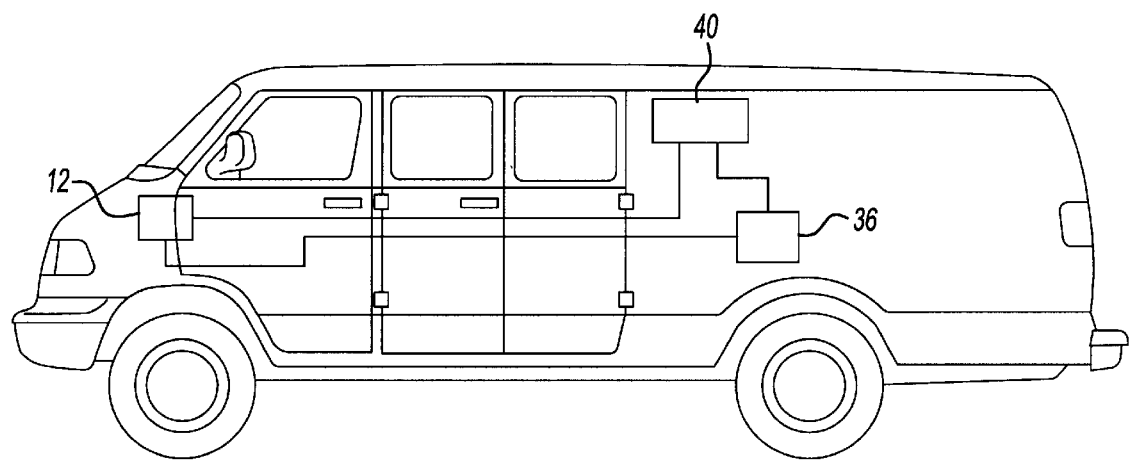
FIG. 3B is a schematic view of a vehicle utilizing a motor control according to the present invention.

Referring now to FIGS. 2, 3 and 4, the present invention is shown and described. Referring to FIG. 2, a fan control system 26 according to the present invention primarily includes a controller 28, rear fan control circuitry 32, front fan switch 12, rear fan switch 94, and motor and circuitry 36. Preferably, however, fan control system 26 also includes rear HVAC circuitry 34, rear seat entertainment system 38 and entertainment panel 96.

Rear fan control circuitry 32 provides fan motor speed control of fan motor 18 from the rear seat of a passenger vehicle. This circuitry provides different voltages across fan motor 18 to result in different fan speeds as desired. The rear fan control circuitry accomplishes this task responsive to electrical signals provided by front fan switch 12 and controller 28, as will be described in greater detail.

HVAC control circuitry 34 provides remaining components and controls required to adjust or set thermostatic values of the HVAC system from the rear seat of the vehicle. Such components and controls include, but are not limited to, temperature, humidity, and circulation mode.

Rear seat entertainment system 38 includes, but is not limited to, any entertainment component, such as TV, VCR, radio, CD-player or other A/V type of entertainment system. Rear seat entertainment system 38 can also include interactive devices such as computers or video games. As is shown, the rear seat entertainment system 38 shares controller 28 with rear HVAC control circuitry 34 and rear fan control circuitry 32. However, it should be noted that individual controllers can be provided for each component, and the present invention is not limited to that disclosed herein.

In FIG. 3A, a control box 40 is shown having a front panel with a plurality of buttons. This front panel provides an input for controller 28, and accordingly includes rear fan switch 94 and entertainment panel 96 (as shown in FIG. 2). Accordingly, control box 40 provides user access to operate the vehicle's fan motor and entertainment system from one location. The control additionally provides a "drop in" approach for rear HVAC controls that is compatible with popular wiring mechanization. Vehicle manufactures can eliminate wiring harness differences between vehicles equipped with the electronic fan control and vehicles equipped with mechanical switches for fan control. However, it should be understood that more or fewer components can be included with the operational features of control box 40. Additionally, separate control boxes can be provided to operate each component independently.

Referring to FIG. 4, the structure and operation of the front fan switch 12, motor and circuitry 36, rear fan control circuitry 32, rear fan switch 94 and controller 28 is described in greater detail.

Rear fan control circuitry 32 uses three separate circuits to provide three different voltages across fan motor 18. Controller 28, to provide the desired fan speeds, selectively energizes a fan low circuit 44, fan medium circuit 46 or a fan high circuit 48. The controller selects the desired circuit and fan speed based on input from a rear seat passenger operating control box 40. The output from any of these circuits, in turn, provides the requisite voltage across fan motor 18 to achieve the desired fan speed. However, controller 28 is responsive to input from control box 40 only when selector switch 22 is set to the REAR position on front fan switch 12. When selector switch is in this position, a logical ON signal is sent to the controller enabling the rear fan switch 94. Otherwise, the rear fan switch 94 is disabled.

The low and medium fan speed operation, as selected on the control box 40 by a rear seated passenger, is now described. First, as described above, the selector switch 22 must be placed into the REAR position to connect the Enable Sense input of the controller to the chassis common ground 50. This provides the logical ON condition. This causes the logic HIGH voltage provided by $R_{pull-up}$ to approach 0v, resulting in a logic LOW condition. Controller 28 senses this logic LOW condition and allows the rear-seated user to control the rear fan via the face panel on control box 40. Accordingly, when the face panel of control box 40 is used to select a low fan condition, controller 28 sets Control A to a logic HIGH condition (preferably about 5 v) to bias transistor Q1 into an ON condition. The base of transistor Q2 is, therefore, pulled low through R4 and transistor Q1, thereby causing transistor Q2 to pass current through its collector-emitter. As a result, current passes through R5 and R9, causing a voltage drop across R9 of approximately 10 v to provide a gate voltage to both MOSFETs Q3 and Q4. (The function of MOSFET Q3 in this invention is unique and will be detailed later.) MOSFET Q3 remains off, initially, as the source voltage of MOSFET Q3 nearly equals its gate voltage. The source voltage to MOSFET Q3 is provided thorough the fan motor, the relay and two 1 ohm resistors, $R1_{FAN}$ and $R2_{FAN}$ provided with the motor and circuitry 36.

MOSFET Q4 turns on as its gate-source voltage exceeds its turn-on threshold voltage requirement. Once MOSFET Q4 turns on, the body diode 52 conducts and pulls the MOSFET Q3 source voltage low, thereby creating a gate-source voltage of about 9.3 v across MOSFET Q3 and a 0.7 v drop across the body diode 52. This causes the gate-source voltage of MOSFET Q3 to exceed the turn-on threshold. However, once MOSFET Q3 is on, its drain-source voltage approaches 0V, negating the 0.7 v drop across the body diode. This causes the full 10V gate-source voltage to be applied across MOSFET Q3. With both MOSFET Q3 and MOSFET Q4 now ON, the fan low circuit 44 setting is complete. Current sourced from the vehicle battery then passes through the fan motor, through the relay, through $R1_{FAN}$ and $R2_{FAN}$, through MOSFET Q3 source-drain, through MOSFET Q4 drain-source, through the front fan switch 12 (set to the REAR position) to chassis common ground 50. Accordingly, fan motor 18 is operated at the low speed based on the resistance of $R1_{FAN\ and\ R2FAN}$.

The fan medium setting operates in the same way as the Fan Low setting, with only the elimination of stepping resistor $R1_{FAN}$. The Fan High setting is controlled similar to the Low and Medium settings with the exception of only one MOSFET Q11 instead of two. Components unique in each circuit will be detailed later.

MOSFETs Q3 and Q7 and the diode D17 have a unique application which is now described. The current switched through circuits 44 and 46 ranges preferably between 6A and 12A respectively. Fan high circuit 48, however, preferably switches less than 0.5 A since the circuit controls a relay coil rather than directly controlling the fan motor 18. If MOSFETS Q3, Q7 and diode D17 were individually or collectively replaced by a short, an incorrect voltage might possibly be applied to the Enable Sense 200 input of the controller 28.

For example, consider the following hypothetical. First, replace MOSFET Q7 by a short while the front fan switch 12 is set to the REAR position. The user then activates the fan high circuit 48. Next, the selector switch 22 of the front fan switch 12 is moved from the REAR position to the OFF position. If the optional vehicle connection 70 between points A and E of the relay is employed, then the following condition exists. The pull-up voltage supplied by $R_{pull-up}$ of the Enable Sense 200 is pulled close to 0V through the body diode 58 of MOSFET Q8, the short replacing MOSFET Q7, $R2_{FAN}$, input A of the relay 16, the contacts of relay 16, and chassis ground 72 through point D of the relay. A similar condition exists if a short replaces MOSFET Q3. Similarly, should the front fan switch be moved to the LOW or MEDIUM positions, the Enable Sense will be pulled to a logic LOW through the body diode 54 or 58. And, depending on the position of the selector switch 22 of the front fan switch 12, it will be pulled low through $R1_{FAN}$ to chassis common 50. With a logic LOW on the Enable Sense, the controller will not be deactivated contrary to the user's desired control settings. Moreover, under this condition, the front fan switch 12 could not be set to disable the Rear Fan Control and the rear fan could continue to operate when undesired.

Accordingly, MOSFETs Q7 and Q3 and corresponding body diodes prevent the failure conditions previously outlined. The MOSFETs are connected with their drain and source terminals reversed from common design practice in order to utilize the body diode to block undesired current paths. A more conventional diode is preferably not used for Circuits 44 and 46 due to the large current switched in these circuits. When MOSFETs Q7 or Q3 are turned ON, the low drain-source resistance allows for very little power dissipation across the devices as compared to conventional diodes. With respect to the fan high circuit, diode D17 provides a similar function as MOSFETs Q3 and Q7 since a much lower current is switched.

In addition to the circuitry just described, the invention uses transient suppression circuitry to protect the MOSFET devices. When fan motor 18 is operating, the path to the chassis common can be broken by moving the selector switch 22 of the front fan switch from the REAR position to the OFF position. This, however, results in a large voltage transient generated by inductance of the fan motor. These transients often surpass 80V, far exceeding the 20V gate-source breakdown voltage of the MOSFET devices, thereby causing MOSFET failure. Accordingly, to alleviate this problem, diodes D1 and D2 in Fan low circuit 44 channel the positive transients back to the vehicle battery. D1 blocks undesired battery voltage from damaging the fan low circuit 44, especially preventing excessive current through diode D2 when the front control 22 is set to a position (such as LOW) connecting chassis common 50 to the cathode side of D2. D2 blocks undesired steady-state battery voltages from the fan motor 18 and related circuitry from damaging, activating or causing vehicle battery drain through the fan low circuit 44. If a short circuit replaces diode D2, battery drain can occur when battery voltage to rear fan control circuitry 32 is switched off and battery current flows through motor 18, through diode D1 then through other circuitry connected to switched battery not shown as a part of this invention. Likewise, diodes D8 and D9 in fan medium circuit 46 and diodes D15 and D16 in fan high circuit 48 provide a similar function for each respective circuit.

Zener diodes D3 and D4 provide specific gate-source voltage breakdown protection for MOSFET Q3 by clamping transients above about 18 v. Zener diodes D10 and D11 provide similar protection to MOSFET Q7. Capacitor C2 provides a quick response to fast transient rise times until diodes D3 and D4 begin to conduct. Capacitor C3 damps very fast transients to help reduce voltage levels applied to D4. Capacitor C3 also protects fan medium circuit 46 since there is only a very low resistance or $R1_{FAN}$ between the two circuits. Diode D12 protects fan low circuit 44 and fan medium circuit 46 from negative transients. Lastly, Diode D6 provides gate source voltage protection to MOSFETs Q4, Q8 and Q11.

The current path in fan high circuit 48 varies slightly from fan low circuit 44 to fan medium circuit 46, requiring diode D18 and capacitor C6. Diode D18 protects from negative transients while C6 bypasses very quick transients. Additionally, Fan high circuit 48 utilizes diodes D15 and D16 to clamp transients to the battery potential and protect the gate-source voltage of MOSFET Q11. If MOSFET Q11 is ON, then the low drain-source resistance may allow transients to pass through the drain to source and exceed the gate-source breakdown voltage. Diode D5, and capacitor C4 protects from excessive gate-source voltage passed by transistor Q2. Finally, diodes D7, D13 and D19 provide a logic OR condition to activate an optional relay 90 and engage, for example, an air conditioning compressor when the rear fan is operating.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A fan control for selecting among a plurality of fan motor speeds and switching motor speed control from a first fan switch to a second fan switch, the fan control comprising:

a controller, the first fan switch electrically connected with the controller;

a fan control circuit electrically connected with the controller, the second fan switch electrically connected with the controller; and a fan motor electrically connected with the fan control circuit;

wherein the controller is responsive to the second fan switch to actuate the fan control circuit for selecting a desired fan motor speed when the first fan switch provides a logical ON signal to the controller, a seat entertainment system electrically connected to the controller; and an entertainment panel electrically connected to the controller;

wherein the controller operates a seat entertainment system responsive to inputs provided from the entertainment panel to the controller.

2. The fan control as claimed in claim 1, wherein the seat entertainment system further comprises at least one member of a set consisting of a CD-player, A/V system, computer, video game, television and radio.

3. The fan control as claimed in claim 1, wherein the entertainment panel and second fan switch are contained in one unit.

4. The fan control as claimed in claim 3, further comprising a HVAC control circuit electrically connected to the fan controller, the HVAC control circuit responsive to inputs from the controller to change operational conditions of an HVAC system.

5. The fan controller as claimed in claim 1, wherein the fan control circuit further comprises at least:
   a fan low circuit electrically connected to the controller; and
   a fan high circuit electrically connected to the controller;
   wherein the controller provides a low control voltage to the fan low circuit responsive to a LOW fan speed request from the second fan switch when the first fan switch is providing the logical ON signal;
   wherein the controller provides a voltage to the fan high circuit responsive to a HIGH fan speed request from the second fan switch when the first fan switch is providing the logical ON signal.

6. The fan control as claimed in claim 5, wherein the fan control circuit further comprises:
   a first MOSFET;
   a second MOSFET;
   a power source; and
   an electrical ground;
   wherein the first MOSFET, second MOSFET and the fan motor are positioned in series between the power source and the electrical ground to form a power circuit;
   wherein the first MOSFET and the second MOSFET are responsive to the low control voltage, to conduct and operate the fan motor.

7. The fan control as claimed in claim 6 further comprising:
   a first body diode in parallel with the first MOSFET and bridging a high potential side of the first MOSFET with a low potential side of the first MOSFET, the body diode allowing current to flow only from the high potential side of the first MOSFET to the low potential side of the first MOSFET; and
   a second body diode in parallel with the second MOSFET and bridging the high potential side of the second MOSFET to a low potential side of the second MOSFET, the second body diode allowing current to flow only from the low potential side of the second MOSFET to the high potential side of the second MOSFET;
   wherein the first MOSFET is at a higher potential position on the power circuit than the second MOSFET.

8. The fan control as claimed in claim 7, further comprising:
   a first zener diode; and
   a second zener diode in series with the first zener diode, the second zener diode biased in an opposite direction from the first zener diode;
   wherein the first zener diode and the second zener diode bridge between the high potential side of the first MOSFET and gates of the first MOSFET and the second MOSFET.

9. The fan control as claimed in claim 7, further comprising a capacitor connecting between the high potential side of the first MOSFET and the electrical ground for damping fast transient currents.

10. The fan control as claimed in claim 7, further comprising an optional relay electrically connected between the high potential side of the first MOSFET and the low potential side of the second MOSFET.

11. The fan control as claimed in claim 5, wherein the fan high circuit further comprises:
    a relay;
    a third MOSFET; and
    a third body diode bridging between a high potential side of the third MOSFET and a low potential side of the third MOSFET;
    wherein the power source, relay, third MOSFET and the electrical ground are positioned in series along a second power circuit;
    wherein a gate of the third MOSFET is responsive to a high control voltage provided from the controller to conduct and energize the relay;
    wherein energizing the relay provides current flow through the fan motor.

12. The fan controls claimed in claim 11, further comprising a diode positioned along the second power circuit between the high potential side of the third MOSFET and the relay, the diode only allowing current flow from the relay to the MOSFET.

13. The fan control as claimed in claim 11, further comprising:
    second diode connecting between the high potential side of the third MOSFET and electrical ground; and
    a second capacitor connecting between the high potential side of the third MOSFET and the electrical ground.

14. A motor vehicle having a HVAC system with a fan motor for providing variable speeds of conditioned air from the HVAC system into an interior of the vehicle, the vehicle having a front seat portion and a rear seat portion, the vehicle comprising:
    a fan control system that comprises:
    a controller;
    a switch electrically connected to the controller and positioned at a front seat area of the vehicle;
    a switch electrically connected to the controller and positioned at a rear seat area of the vehicle;
    a rear fan control circuit electrically connected to the controller; and
    a fan motor electrically connected to the front fan switch and the rear fan control circuit;
    wherein the controller is responsive to the rear fan switch to actuate the rear fan control circuit for selecting a desired fan motor speed when the front fan switch provides a logical ON signal to the controller,
    an entertainment system electrically connected to the controller; and
    an entertainment panel electrically connected to the controller;
    wherein the controller is responsive to inputs from the entertainment panel to operate the entertainment system.

15. The vehicle as claimed in claim 14, wherein the entertainment system further comprises at least a television, CD player, radio, computer, video game, or A/V system.

16. The vehicle as claimed in claim 15, wherein the entertainment panel and a rear fan switch are contained in one unit.

17. An improved HVAC fan control for a vehicle, the HVAC fan control having a front fan switch operative to switch a fan motor between plural fan speeds and to shift fan speed control from the front fan switch to a rear fan switch, the front fan switch being located at a front seat portion of a vehicle and the rear fan switch being located at a rear seat portion of the vehicle, the improvement comprising:

a controller electrically connected to the front fan switch and the rear fan switch; and a rear fan control circuit electrically connected to the controller;

wherein the fan motor is electrically connected to the rear fan control circuit and the front fan switch;

wherein the controller is responsive to the rear fan switch to actuate the rear fan control circuit for selecting a desired fan motor speed when the front fan switch provides a logical ON signal to the controller, wherein the rear fan control circuit further comprises at least:

fan low circuit electrically connected to the controller; and a fan high circuit electrically connected to the controller;

wherein the controller provides a low control voltage to the fan low circuit responsive to a LOW fan speed request from the second fan switch when the first fan switch is providing the logical ON signal;

wherein the controller provides a voltage to the fan high circuit responsive to a HIGH fan speed request from the second fan switch when the first fan switch is providing the logical ON signal.

18. The fan control as claimed in claim 17, wherein the rear fan control circuit further comprises:

a first MOSFET;

a second MOSFET;

a power source; and an electrical ground;

wherein the first MOSFET, second MOSFET and the fan motor are positioned in series between the power source and the electrical ground to form a power circuit;

wherein the first MOSFET and the second MOSFET are responsive to the low control voltage to conduct and operate the fan motor.

19. The fan control as claimed in claim 18, further comprising:

a first body diode in parallel with the first MOSFET and bridging a high potential side of the first MOSFET with a low potential side of the first MOSFET, the body diode allowing current to flow only from the high potential side of the first MOSFET to the low potential side of the first MOSFET; and a second body diode in parallel with the second MOSFET and bridging the high potential side of the second MOSFET to a low potential side of the second MOSFET, the second body diode allowing current to flow only from the low potential side of the second MOSFET to the high potential side of the second MOSFET;

wherein the first MOSFET is at a higher potential position on the power circuit than the second MOSFET.

20. The fan control as claimed in claim 19, further comprising:

a first zener diode; and a second zener diode in series with the first zener diode, the second zener diode biased in an opposite direction from the first zener diode;

wherein the first zener diode and the second zener diode bridge between the high potential side of the first MOSFET and gates of the first MOSFET and the second MOSFET.

* * * * *